Patented Apr. 25, 1944

2,347,257

UNITED STATES PATENT OFFICE 2,347,257

PROCESS FOR PURIFYING HYDROCHLORIC ACID

Frank L. Frost, Jr., Wilmington, Del., assignor to E. I. du Pont de Nemours & Company, Wilmington, Del., a corporation of Delaware No Drawing. Application September 24, 1942,
Serial No. 459,595

5 Claims. (Cl. 23—154)

This invention relates to the manufacture of chemically pure hydrochloric acid and is particularly directed to methods in which the crude acid prior to being subjected to distillation is treated with a sulfamate in order to decompose any nitrogen oxides which might be dissolved in the acid.

When hydrochloric acid is manufactured from sulfuric acid containing dissolved nitrogen oxides, as is frequently the case when the acid has its origin in a lead chamber process, the hydrochloric acid produced contains the same nitrogen oxides usually as traces of nitric or nitrous acid. When the acid is distilled in the manufacture of chemically pure acid these same oxygen compounds persist and react with the hydrochloric acid to liberate free chlorine which in many applications is exceedingly objectionable.

It has been customary in the past when these conditions have been encountered to treat the sulfuric acid with an ammonium salt, such as ammonium sulfate, which is supposed to react with the nitrogen compounds and decompose them to elemental nitrogen. Such a process, for example, is described in Lunge, 4th edition, vol. 1, part II, page 1069. The efficacy of this treatment, however, remains doubtful and in any event high temperatures are required to effect the reduction. Thus it is stated in U. S. Patent 1,836,849 that the "reaction between ammonium sulfate and nitric or nitrous acids requires relatively high temperatures" and similar and more complete information on the effect of adding ammonium sulfate or ammonium acid sulfate, or ammonium chloride, is given by D. E. Sil'verman, Journal of Chemical Industry (USSR), vol. 17, (1940) pp. 47–49; Abstracts—Chemical Abstracts, vol 34, July 20, 1940, p. 4867. More recently it has been found (Patent 2,198,686) that urea also effects reduction of nitric and nitrous acids in sulfuric acid, but the efficacy of urea is dependent on high temperatures.

According to the prior art, therefore, it has been considered necessary in order to produce a chemically pure hydrochloric acid free of dissolved nitrogen oxides to destroy these nitrogen oxides at their source, that is, in the sulfuric acid used to produce the crude hydrochloric acid. This cumbersome method is subject to two principal disadvantages, namely, that of either correlating crude acid production with C. P. acid production or producing much larger quantities of crude hydrochloric acid free of nitrogen oxides than was actually required and that of having to heat the acid in order to effect reduction of the nitrogen oxides.

I have now discovered a method of avoiding the disadvantages of the prior art in which the nitrogen oxides are removed directly from the hydrochloric acid prior to its distillation by adding a sulfamate thereto. The sulfamate, sulfamic acid or a suitable salt such as ammonium sulfamate, attacks the dissolved nitrogen oxides even at ordinary temperatures and purges the crude hydrochloric acid of these objectionable compounds without in any wise deleteriously affecting the quality or character of the chemically pure acid obtained in the distillation. Economies are thus effected beyond the possibilities of the prior art methods.

My invention is simple and requires little further explanation. Methods for effecting distillation of crude hydrochloric acid to produce chemically pure acid are well known in the art and it is only necessary according to my invention to add sulfamic acid or ammonium sulfamate, or like sulfamate, and allow it to stand until the dissolved nitrogen oxides are decomposed.

A suitable distillation process is illustrated in U. S. Patent 2,196,246 granted to Brown and Hill April 9, 1940. Thus, according to my invention crude hydrochloric acid contaminated with traces of nitrogen oxides, say in the order of 1 to 2 parts per million of nitrogen oxides, is treated with an appropriate amount of sulfamic acid, say from 25 to 50 parts per million by weight, and allowed to stand for a period of 10 minutes to 2 hours. Thereafter the acid is treated with an oxidizing agent and distilled as more particularly described in the Brown and Hill patent. The product so obtained will be found free of chlorine even after longer periods of storage.

The invention may be more fully understood by the following example, in which the parts are by weight unless otherwise specified:

Example

To 22,000 pounds of 22° Baumé crude hydrochloric acid containing approximately 1 part per million of nitrogen oxides as $N_2O_3$ (0.022 lbs.) is treated with 1.07 pounds of sulfamic acid dissolved in 2.604 liters of water. The acid was agitated for 5 minutes and allowed to stand for 1 hour at atmospheric temperature (70–80° F.). Analysis then showed no nitrogen oxides present. The acid was then treated with sodium chlorate and distilled according to the method set out above to give a product free of both chlorine and nitrogen oxides.

While I have described a particular application of my invention it will be understood that variations may be made without departing from the spirit and scope thereof. Thus I may use any amount of sulfamate consistent with the objects of my invention. The effects of varying amounts of sulfamic acid are shown in the following table in which 22° Baumé crude hydrochloric acid containing 1.6 parts per million nitrogen oxides as $N_2O_3$ was treated with varying amounts of sulfamic acid while maintaining a temperature of 70° F.

Table

| Amount of sulfamic acid | Niter test | Times in hours |
|---|---|---|
| 4 times theoretical | Present | 5.0 |
| 4 times theoretical | Absent | 20.0 |
| 20 times theoretical | ---do--- | 1.0 |
| 50 times theoretical | ---do--- | 0.25 |
| 100 times theoretical | ---do--- | 0.25 |
| 200 times theoretical | ---do--- | 0.25 |

Any amount of sulfamate up to 200 parts per million will accomplish at least in part the purpose of my invention and greater amounts may be used. As little as 6 to 10 parts per million of sulfamate will remove nitrogen oxides in 10 to 20 hours whereas 125 to 200 parts per million will remove nitrogen oxides almost immediately. As much as 200 parts per million of sulfamate may be used without fear of contamination of the final distillation product.

Those skilled in the art will thus be able to correlate the amount of sulfamate with the time required to effect complete removal of nitrogen oxides. Ordinarily, however, it will be preferred to employ around 25 to 50 parts per million of sulfamate since then the niter removal is complete within a relatively short period of from 10 minutes to 2 hours.

My invention is also susceptible to use in connection with methods of purifying crude hydrochloric acid other than by distillation.

My invention is of particular advantage in that the niter is removed directly from the hydrochloric acid rather than from a raw material used in the manufacture of that acid. This is made possible by the activity of the sulfamates in the cold acid. Obviously it would be impractical similarly to utilize material such as urea and ammonium sulfate in an acid so readily volatile as hydrochloric acid. Thus my invention eliminates the necessity of treating the sulfuric acid utilized in the manufacture of the crude hydrochloric acid and withal simplifies the process and produces substantial economies in the cost of manufacture.

The term "sulfamate" as used herein includes hydrogen sulfamate (sulfamic acid) which has the formula $HOSO_2NH_2$ and the salts thereof.

I claim:

1. In the manufacture of chemically pure hydrochloric acid by distillation of crude hydrochloric acid containing traces of dissolved nitrogen oxides the step of adding to the crude hydrochloric acid a sulfamate.

2. In the manufacture of chemically pure hydrochloric acid by distillation of crude hydrochloric acid containing traces of dissolved nitrogen oxides the step of adding to the crude hydrochloric acid a sulfamate in that amount required to decompose substantially all of the dissolved nitrogen oxides.

3. In the manufacture of chemically pure hydrochloric acid by distillation of crude hydrochloric acid containing traces of dissolved nitrogen oxides the steps of adding to the crude muriatic acid a sulfamate in the proportions of 25 to 50 parts per million of sulfamate based on the weight of the hydrochloric acid and allowing the treated acid to stand for a period of 10 minutes to 2 hours and then subjecting it to distillation.

4. In the purification of crude hydrochloric acid contaminated with dissolved nitrogen oxides the step of adding to the acid a sulfamate.

5. In the purification of crude hydrochloric acid contaminated with nitrogen oxides the steps of adding to the crude hydrochloric acid a sulfamate in an amount at least equivalent to the nitrogen oxides and then subjecting it to further purification after the nitrogen oxides are decomposed.

FRANK L. FROST, Jr.